United States Patent
Kashihara

(10) Patent No.: US 10,065,153 B2
(45) Date of Patent: Sep. 4, 2018

(54) WATER TREATMENT SYSTEM

(71) Applicant: SUMITOMO ELECTRIC INDUSTRIES, LTD., Osaka-shi, Osaka (JP)

(72) Inventor: Hideki Kashihara, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 135 days.

(21) Appl. No.: 15/318,463

(22) PCT Filed: Jun. 26, 2015

(86) PCT No.: PCT/JP2015/068455
§ 371 (c)(1),
(2) Date: Dec. 13, 2016

(87) PCT Pub. No.: WO2016/017335
PCT Pub. Date: Feb. 4, 2016

(65) Prior Publication Data
US 2017/0128887 A1    May 11, 2017

(30) Foreign Application Priority Data
Aug. 1, 2014   (JP) ................ 2014-157846

(51) Int. Cl.
*B01D 63/02* (2006.01)
*B01D 65/02* (2006.01)
(Continued)

(52) U.S. Cl.
CPC .......... *B01D 63/02* (2013.01); *B01D 17/047* (2013.01); *B01D 17/085* (2013.01); *B01D 65/02* (2013.01);
(Continued)

(58) Field of Classification Search
CPC ............ B01D 2311/04; B01D 2311/25; B01D 2311/2661; B01D 2311/2665;
(Continued)

(56) References Cited

U.S. PATENT DOCUMENTS 9,981,864 B2 *  5/2018  Sakurai ................. C02F 1/444
2010/0000941 A1 *  1/2010  Muller .................. B01D 61/20
                                                                     210/636

FOREIGN PATENT DOCUMENTS

JP    H06-285496 A    10/1994
JP    2002-011332 A    1/2002
(Continued)

*Primary Examiner* — Terry K Cecil
(74) *Attorney, Agent, or Firm* — Drinker Biddle & Reath LLP

(57) ABSTRACT

An object of the present invention is to provide a water treatment system in which explosions can be prevented even when filtering water to be treated that is able to generate flammable gas. A water treatment system according to an embodiment of the present invention includes a water-to-be-treated tank which stores water to be treated, a crossflow-type filtration membrane module which filters the water to be treated, a supply passage through which the water to be treated is supplied to the filtration membrane module from the water-to-be-treated tank by using a supply pump, and a recirculation passage through which the water to be treated is recirculated from the filtration membrane module to the water-to-be-treated tank. The supply passage is provided with an aspirator which mixes a gas with the supplied water to be treated, the gas being recirculated through the recirculation passage to the water-to-be-treated tank together with the water to be treated. The water-to-be-treated tank has an upper space provided above the liquid surface of the stored water to be treated, the upper space being hermetically filled with an inert gas. The water-to-be-treated tank is (Continued)

further provided with a gas transport passage through which the inert gas is supplied from the upper space to the aspirator.

16 Claims, 1 Drawing Sheet

(51) Int. Cl.
*C02F 1/44* (2006.01)
*B01F 5/04* (2006.01)
*B01F 3/04* (2006.01)
*B01D 17/04* (2006.01)
*B01D 17/00* (2006.01)
*C02F 101/32* (2006.01)

(52) U.S. Cl.
CPC ............ *B01F 3/04503* (2013.01); *B01F 5/04* (2013.01); *C02F 1/44* (2013.01); *B01D 2311/04* (2013.01); *B01D 2311/06* (2013.01); *B01D 2311/26* (2013.01); *B01D 2311/2661* (2013.01); *B01D 2311/2665* (2013.01); *B01D 2313/20* (2013.01); *B01D 2313/24* (2013.01); *B01D 2313/26* (2013.01); *B01D 2313/50* (2013.01); *B01D 2315/10* (2013.01); *B01D 2319/04* (2013.01); *B01D 2321/04* (2013.01); *C02F 2101/32* (2013.01); *C02F 2301/046* (2013.01); *C02F 2303/16* (2013.01)

(58) Field of Classification Search
CPC .... B01D 2313/26; B01D 63/02; B01D 65/02; C02F 1/44–1/448; C02F 2301/046; B01F 3/04503; B01F 5/04
See application file for complete search history.

(56) References Cited

FOREIGN PATENT DOCUMENTS

| | | | |
|---|---|---|---|
| JP | 2009-148673 | A | 7/2009 |
| JP | 2010-064039 | A | 3/2010 |
| JP | 2010-207762 | A | 9/2010 |
| JP | 2012-205991 | A | 10/2012 |
| JP | 2014-117645 | A | 6/2014 |

* cited by examiner

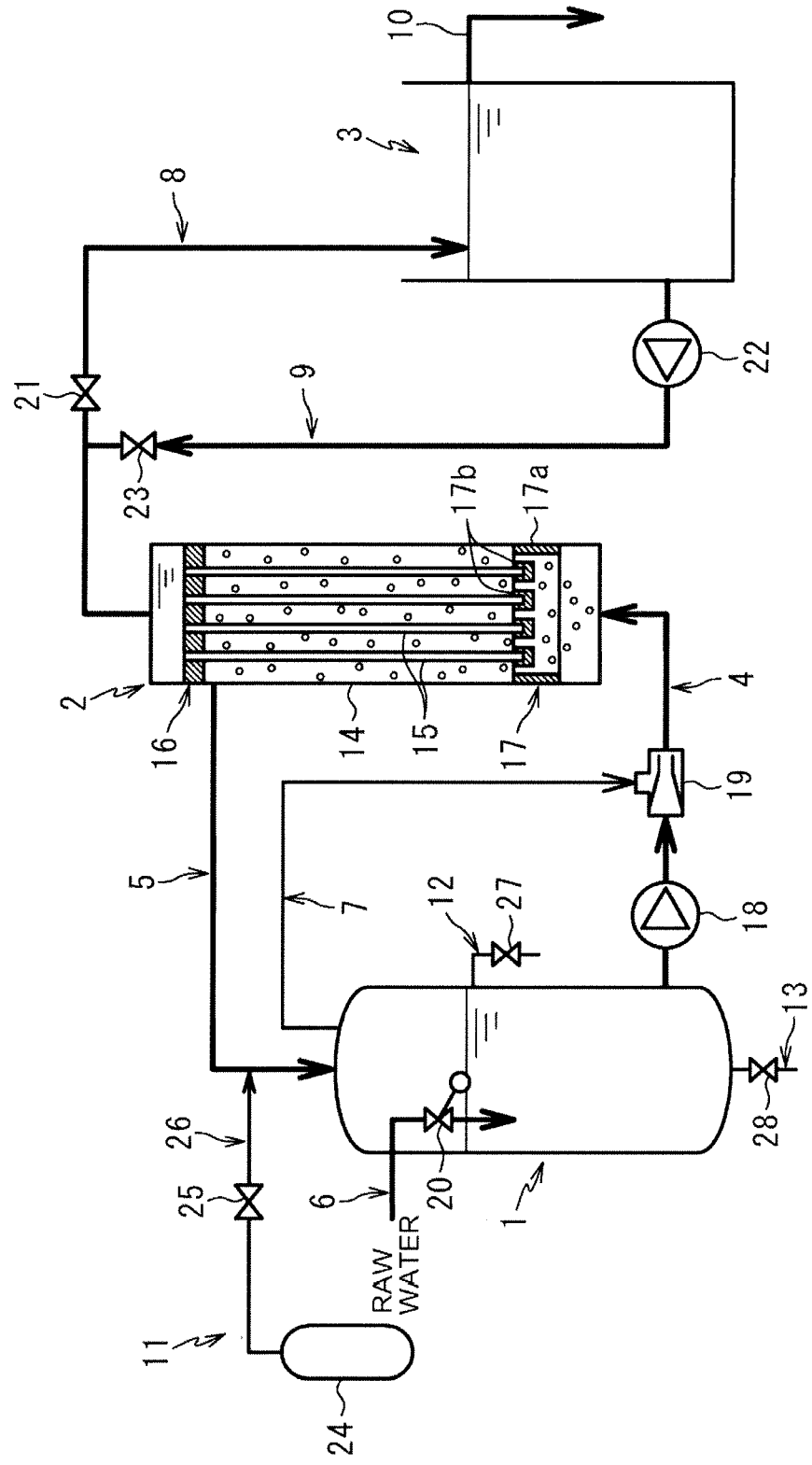

WATER TREATMENT SYSTEM

TECHNICAL FIELD

The present invention relates to a water treatment system.

BACKGROUND ART

Water treatment systems which remove oil and suspended solids from water to be treated containing oil and suspended solids by using filtration membranes are known. By configuring water treatment systems such that water to be treated is supplied from one end side of filtration membranes and discharged from the other end side of the filtration membranes, i.e., crossflow filtration is performed, it is possible to reduce clogging of the filtration membranes even in the case of treating water to be treated containing large amounts of oil and suspended solids, such as oilfield-produced water.

Furthermore, by mixing a gas with water to be treated, clogging of filtration membranes can be suppressed by the scrubbing effect of gas bubbles. As a method for mixing a gas with water to be treated, there has been proposed a method using an aspirator (also referred to as an ejector) which produces a negative pressure by means of the Venturi effect due to constriction of a passage of water to be treated and which aspirates a gas into water to be treated (refer to Japanese Unexamined Patent Application Publication No. 2009-148673).

CITATION LIST

Patent Literature

PTL 1: Japanese Unexamined Patent Application Publication No. 2009-148673

SUMMARY OF INVENTION

Technical Problem

In the water treatment system disclosed in the patent application publication described above, a gas is introduced into water to be treated by aspiration of air by the aspirator. However, in water to be treated, organic substances contained therein may be decomposed to generate flammable gas, or dissolved flammable gas may become gasified because of pressure variation. When air is introduced into such water to be treated, there is a concern that flammable gas inside a filtration membrane module may explode. Therefore, in some cases, it is not possible to apply the water treatment system of the patent application publication described above to water to be treated that is able to generate flammable gas.

The present invention has been realized under the circumstances described above. It is an object of the present invention to provide a water treatment system in which explosions can be prevented even when filtering water to be treated that is able to generate flammable gas.

Solution to Problem

A water treatment system according to an embodiment of the present invention, which has been developed to solve the problems described above, includes a water-to-be-treated tank which stores water to be treated, a crossflow-type filtration membrane module which filters the water to be treated, a supply passage through which the water to be treated is supplied to the filtration membrane module from the water-to-be-treated tank by using a supply pump, and a recirculation passage through which the water to be treated is recirculated from the filtration membrane module to the water-to-be-treated tank. The supply passage is provided with an aspirator which mixes a gas with the supplied water to be treated, the gas being recirculated through the recirculation passage to the water-to-be-treated tank together with the water to be treated. The water-to-be-treated tank has an upper space provided above the liquid surface of the stored water to be treated, the upper space being hermetically filled with an inert gas. The water-to-be-treated tank is further provided with a gas transport passage through which the inert gas is supplied from the upper space to the aspirator.

Advantageous Effects of Invention

In a water treatment system according to an embodiment of the present invention, explosions can be prevented even when filtering water to be treated that is able to generate flammable gas.

BRIEF DESCRIPTION OF DRAWINGS

FIG. 1 is a schematic diagram showing a structure of a water treatment system according to an embodiment of the present invention.

DESCRIPTION OF EMBODIMENTS

Description of Embodiments of the Present Invention

A water treatment system according to an embodiment of the present invention includes a water-to-be-treated tank which stores water to be treated, a crossflow-type filtration membrane module which filters the water to be treated, a supply passage through which the water to be treated is supplied to the filtration membrane module from the water-to-be-treated tank by using a supply pump, and a recirculation passage through which the water to be treated is recirculated from the filtration membrane module to the water-to-be-treated tank. The supply passage is provided with an aspirator which mixes a gas with the supplied water to be treated, the gas being recirculated through the recirculation passage to the water-to-be-treated tank together with the water to be treated. The water-to-be-treated tank has an upper space provided above the liquid surface of the stored water to be treated, the upper space being hermetically filled with an inert gas. The water-to-be-treated tank is further provided with a gas transport passage through which the inert gas is supplied from the upper space to the aspirator.

Since the water treatment system is further provided with the gas transport passage through which the inert gas is supplied from the upper space to the aspirator, it is possible to supply water to be treated containing gas bubbles of the inert gas to the filtration membrane module, and clogging of filtration membranes can be suppressed by the scrubbing effect of gas bubbles. Moreover, in the water treatment system, since the inert gas is allowed to hermetically fill the space above the liquid surface of the stored water to be treated, it is possible to eliminate gaseous oxygen from a closed system for circulating water to be treated between the water-to-be-treated tank and the filtration membrane module. Therefore, in the water treatment system, even if flammable gas is generated from water to be treated, explosions can be prevented by maintaining a low oxygen concentration in the gas.

The filtration membrane module may include an airtight filtration tank, a plurality of hollow-fiber membranes disposed inside the filtration tank and held in a state of being arranged in parallel in one direction, and holding members configured to fix both ends of the hollow-fiber membranes, wherein the supply passage is connected to one end side, in the direction in which the hollow-fiber membranes are arranged in parallel, of the filtration tank, the recirculation passage is connected to the other end side, in the direction in which the hollow-fiber membranes are arranged in parallel, of the filtration tank, and the internal pressure of the filtration tank is higher than the atmospheric pressure. By performing external-pressure crossflow-type filtration using the hollow-fiber membranes as described above, water to be treated can be filtered efficiently, and it is possible to reduce the risk of taking in the outside air.

Preferably, the ratio of the volume of the upper space to the total internal volume of the water-to-be-treated tank is ¼ to ⅔. When the ratio of the volume of the upper space to the total internal volume of the water-to-be-treated tank is set in the range described above, by continuing to uninterruptedly supply an inert gas to the filtration membrane module, without unnecessarily increasing the size of the water-to-be-treated tank, it is possible to suppress clogging of the filtration membranes reliably.

More preferably, the water treatment system further includes a raw water passage through which water to be treated is newly supplied to the water-to-be-treated tank, and a liquid level-adjusting mechanism which adjusts the flow rate of water to be treated in the raw water passage so as to maintain the height of the liquid level in the water-to-be-treated tank. When provided with the raw water passage and the liquid level-adjusting mechanism, it is possible to prevent a decrease in the pressure of the inert gas inside the water-to-be-treated tank, and therefore, the amount of inert gas aspirated by the aspirator can be kept constant.

The inert gas may contain nitrogen as a main component. When the inert gas contains nitrogen as a main component, explosions can be prevented relatively inexpensively.

The water treatment system may further include a treated water tank which stores treated water, a treated water passage through which treated water is fed from the filtration membrane module to the treated water tank, and a backwash water passage through which treated water is pressure-fed from the treated water tank to the filtration membrane module by using a backwash pump. When provided with the treated water tank, the treated water passage, and the backwash water passage, the filtration membranes can be easily and reliably backwashed by treated water.

The water treatment system may further include an inert gas supply unit configured to introduce the inert gas into the water-to-be-treated tank or the recirculation passage. By providing the inert gas supply unit, the inert gas can be easily replenished inside the system when the amount of inert gas in the system is decreased because of dissolution into water to be treated or leakage to the outside of the system.

The water treatment system may further include a suspended matter discharge passage through which suspended matter in the vicinity of the liquid surface of water to be treated are discharged from the water-to-be-treated tank. When provided with the suspended matter discharge passage, suspended matter can be discharged to the outside of the system, and it is possible to prevent suspended matter from being supplied to the filtration membrane module to cause clogging of the filtration membranes.

The water treatment system may further include a sediment discharge passage for discharging sediments in water to be treated from the bottom of the water-to-be-treated tank. When provided with the sediment discharge passage, sediments can be discharged to the outside of the system, and it is possible to prevent sediments from being supplied to the filtration membrane module to cause clogging of the filtration membranes.

The term "inert gas" refers to a gas having a low oxygen concentration or having no combustibility or explosiveness even when in contact with volatile components in oil, and specifically, a gas having an oxygen volume content of 10% or less, preferably 1% or less. The term "main component" refers to a component whose volume content is the highest, and preferably a component having a volume content of 50% or more.

Detailed Description of Embodiments of the Present Invention

Embodiments of the water treatment system according to the present invention will be described in detail with reference to the drawing.

A water treatment system shown in FIG. 1 is a system configured to remove oil and suspended solids from water to be treated containing oil and suspended solids. Examples of the water to be treated by the water treatment system include oilfield-produced water produced in oilfields and the like. Water preliminarily treated with a sand filter or the like may be used as the water to be treated.

The water treatment system shown in FIG. 1 includes mainly a water-to-be-treated tank 1 which stores water to be treated containing oil and suspended solids, a filtration membrane module 2 which filters the water to be treated in a crossflow manner, and a treated water tank 3 which stores treated water filtered by the filtration membrane module 2.

The water treatment system further includes a supply passage 4 through which the water to be treated is supplied from the water-to-be-treated tank 1 to the filtration membrane module 2, a recirculation passage 5 through which the water to be treated is recirculated, together with gas mixed in the water to be treated, from the filtration membrane module 2 to the water-to-be-treated tank 1, a raw water passage 6 through which water to be treated (hereinafter, may be referred to as "raw water") is newly supplied from a raw water tank or the like (not shown) to the water-to-be-treated tank 1, a gas transport passage 7 through which a gas in an upper space formed above the water to be treated in the water-to-be-treated tank 1 is fed to the supply passage 4, a treated water passage 8 through which treated water is fed from the filtration membrane module 2 to the treated water tank 3, a backwash water passage 9 through which treated water is pressure-fed from the treated water tank 3 to the treated water passage 8, and to the filtration membrane module 2, a discharge channel 10 for overflowing and discharging treated water from the treated water tank 3, an inert gas supply unit 11 configured to introduce an inert gas into the recirculation passage 5, a suspended matter discharge passage 12 through which suspended matter in the water to be treated inside the water-to-be-treated tank 1 is discharged, and a sediment discharge passage 13 through which sediments in the water to be treated inside the water-to-be-treated tank 1 are discharged.

<Water-to-be-Treated Tank>

The water-to-be-treated tank 1 is an airtight container. The water-to-be-treated tank 1 is made of a metal or resin so as to have a strength that can endure the internal pressure. In particular, from the viewpoint of strength, heat resistance, chemical resistance, and the like, the material for the water-to-be-treated tank 1 is preferably stainless steel, polypropylene, or an acrylonitrile-butadiene-styrene copolymer (ABS resin). Furthermore, the water-to-be-treated tank 1 may be provided, on the outer side thereof, with a reinforcing member, a leg member for self-support, and the like.

The supply passage 4 is connected to the side wall of the water-to-be-treated tank 1 at a position distant from the bottom of the water-to-be-treated tank 1 so as to prevent sediments in the water-to-be-treated tank 1 from flowing out. The recirculation passage 5 and the gas transport passage 7 are connected to the top wall of the water-to-be-treated tank 1. The suspended matter discharge passage 12 is connected to the side wall of the water-to-be-treated tank 1 at a position near the liquid surface of the stored water to be treated, and the sediment discharge passage 13 is connected to the bottom of the water-to-be-treated tank 1.

The amount of water stored in the water-to-be-treated tank 1 is appropriately selected depending on the amount of raw water to be treated, the contents of oil and suspended solids, and the like. For example, in the case where the amount of water to be treated that is supplied from the supply passage 4 to the filtration membrane module 2 is 240 L/hr and the amount of treated water flowing from the filtration membrane module 2 to the treated water passage 8 is 80 L/hr, the amount of water stored in the water-to-be-treated tank 1 can be 30 to 200 L.

The water-to-be-treated tank 1 has an upper space provided above the liquid surface of the stored water to be treated, the upper space being hermetically filled with an inert gas. The lower limit of the ratio of the volume of the upper space to the total internal volume of the water-to-be-treated tank 1 is preferably ¼, and more preferably ⅓. Furthermore, the upper limit of the ratio of the volume of the upper space to the total internal volume of the water-to-be-treated tank 1 is preferably ⅔, and more preferably ½. When the ratio of the volume of the upper space to the total internal volume of the water-to-be-treated tank 1 is less than the lower limit, there is a concern that it may not be possible to enclose a sufficient amount of inert gas in the system, that water to be treated may flow into the gas transport passage 7, and that it may not be possible to supply the inert gas stably to the supply passage 4. On the other hand, when the ratio of the volume of the upper space to the total internal volume of the water-to-be-treated tank 1 is more than the upper limit, there is a concern that the size of the water-to-be-treated tank 1 may be increased unnecessarily.

<Filtration Membrane Module>

The filtration membrane module 2 includes an airtight filtration tank 14 to be filled with water to be treated, a plurality of hollow-fiber membranes 15 disposed inside the filtration tank 14 and held in a state of being arranged in parallel in the upward-downward direction, an upper holding member 16 which fixes the upper ends of the hollow-fiber membranes 15, and a lower holding member 17 which fixes the lower ends of the hollow-fiber membranes 15.

(Filtration Tank)

The filtration tank 14 is a container capable of storing a liquid in a pressurized state in which the internal pressure is higher than the atmospheric pressure. Usually, the filtration tank 14 is installed in a standing manner and is an airtight tubular body with both ends being sealed. The planar shape of the filtration tank 14 is not particularly limited, and for example, is circular, polygonal, or the like. Furthermore, inside the filtration tank 14, the hollow-fiber membranes 15 are disposed and arranged in parallel in the same direction as the axial direction of the filtration tank 14.

The filtration tank 14 is made of a metal or resin so as to have a strength that can endure the pressure of water to be treated. In particular, from the viewpoint of strength, heat resistance, chemical resistance, and the like, the material for the filtration tank 14 is preferably stainless steel, polypropylene, or an acrylonitrile-butadiene-styrene copolymer (ABS resin). Furthermore, the filtration tank 14 may be provided, on the outer side thereof, with a reinforcing member, a leg member for self-support, and the like.

The supply passage 4 is connected to the lower end of the filtration tank 14, i.e., one end side in the direction in which the hollow-fiber membranes 15 are arranged in parallel in the filtration tank 14, and the recirculation passage 5 is connected to the other end side in the direction in which the hollow-fiber membranes are arranged in parallel in the filtration tank 14, more specifically, the side wall at a position slightly below the upper holding member 16. Thereby, a closed system in which water to be treated is circulated between the water-to-be-treated tank 1 and the filtration membrane module 2 is formed. Furthermore, the treated water passage 8 is connected to the upper end of the filtration tank 14.

More specifically, in the filtration membrane module 2, water to be treated containing gas bubbles of an inert gas is introduced in a pressurized state to a portion lower than the lower ends of the hollow-fiber membranes 15, and the water to be treated that has been supplied into the filtration tank 14, together with the gas bubbles of the inert gas, rises along the hollow-fiber membranes 15 and is discharged from the recirculation passage 5 located on the upper end side of the hollow-fiber membranes 15. Furthermore, part of the water to be treated passes through the hollow-fiber membranes 15 to become treated water, which is discharged into the treated water passage 8.

The internal pressure of the filtration tank 14 during steady operation is, for example, 10 to 200 kPa in terms of gauge pressure. The internal pressure of the filtration tank 14 can be adjusted by the output of a supply pump 18 and the pressure of the inert gas introduced into the water-to-be-treated tank 1. Furthermore, in order to obtain the internal pressure of the filtration tank 14, for example, a throttle valve, an orifice, or the like may be placed in the recirculation passage 5. The "internal pressure" of the filtration tank 14 means the average of the pressure at the upper surface of the lower holding member 17, i.e., the lower end of an exposed region of the hollow-fiber membranes 15, and the pressure at the lower surface of the upper holding member 16, i.e., the upper end of the exposed region of the hollow-fiber membranes.

(Hollow-Fiber Membrane)

The hollow-fiber membranes 15 are each a porous hollow-fiber membrane which allows water to pass through pores inside thereof, and which prevents permeation of oil droplets and particulate suspended solids contained in water to be treated.

Each hollow-fiber membrane 15 includes a cylindrical support layer and a filtration layer disposed on a surface of the support layer. By forming the hollow-fiber membrane 15 so as to have such a multilayer structure, both water permeability and mechanical strength can be achieved, and the effect of surface cleaning with gas bubbles can be enhanced.

The support layer and the filtration layer each may be composed of a material containing polytetrafluoroethylene (PTFE) as a main component. By forming each of the support layer and the filtration layer using a material containing PTFE as a main component, the hollow-fiber membranes 15 can have excellent mechanical strength, the amount of deflection can be decreased even if the aspect ratio, which is the ratio of the average length to the average outside diameter of the hollow-fiber membranes, is high, and the surfaces of the hollow-fiber membranes are unlikely to sustain damage or the like due to scrubbing with gas bubbles. Furthermore, other polymers, additives, and the like may be appropriately added to the material for each of the support layer and the filtration layer.

The lower limit of the number-average molecular weight of PTFE of each of the support layer and the filtration layer is preferably 500,000, and more preferably 2,000,000. The upper limit of the number-average molecular weight of PTFE of each of the support layer and the filtration layer is preferably 20,000,000. When the number-average molecular weight of PTFE is less than the lower limit, there is a concern that the surfaces of the hollow-fiber membranes 15 may be damaged by scrubbing with gas bubbles, or the mechanical strength of the hollow-fiber membranes 15 may become insufficient. On the other hand, when the number-average molecular weight of PTFE is more than the upper limit, there is a concern that formation of pores of the hollow-fiber membranes 15 may become difficult.

As the support layer, for example, a tube obtained by extrusion of PTFE may be used. By using an extruded tube as the support layer, mechanical strength can be imparted to the support layer and pores can be formed easily. Preferably, the tube is stretched at a stretching ratio of 50% to 700% in the axial direction and at a stretching ratio of 5% to 100% in the circumferential direction.

The stretching is preferably performed at a temperature that is equal to or lower than the melting point of the tube material, for example, at 0° C. to 300° C. In order to obtain a porous body having a relatively large pore diameter, stretching may be performed at a low temperature. In order to obtain a porous body having a relatively small pore diameter, stretching may be performed at a high temperature. By performing heat treatment, at a temperature of 200° C. to 300° C. for 1 to 30 minutes, on the stretched porous body while maintaining the stretched state by fixing both ends, high dimensional stability can be obtained. Furthermore, by combining the conditions, such as the stretching temperature and the stretching ratio, it is possible to adjust the size of pores of the porous body.

The tube constituting the support layer can be obtained, for example, by blending PTFE fine powder with a liquid lubricant, such as naphtha, and forming the resulting mixture into a tube shape by extrusion or the like, followed by stretching. Furthermore, by holding and sintering the tube in a heating furnace which is maintained at a temperature equal to or higher than the melting point of the PTFE fine powder, for example, at 350° C. to 550° C., for several tens of seconds to several minutes, dimensional stability can be enhanced.

The average thickness of the support layer is preferably 0.1 to 3 mm. By setting the average thickness of the support layer to be in the range described above, mechanical strength and water permeability can be imparted to the hollow-fiber membrane 15 in a balanced manner.

The filtration layer can be formed, for example, by winding a PTFE sheet around the support layer, followed by sintering. By using a sheet as the material for the filtration layer, stretching can be easily performed, adjustment of the shape and size of pores is facilitated, and the thickness of the filtration layer can be decreased. Furthermore, by performing sintering with the sheet being wound, the support layer and the filtration layer are integrated, and pores of both layers are made to communicate with one another, thus enabling to improve water permeability. The sintering temperature is preferably equal to or higher than the melting point of each of the tube constituting the support layer and the sheet constituting the filtration layer.

The sheet constituting the filtration layer can be formed, for example, by using (1) a method in which an unsintered shaped body obtained by extrusion of a resin is stretched at a temperature equal to or lower than the melting point, followed by sintering, or (2) a method in which a sintered resin shaped body is slowly cooled to enhance the crystallinity, and then stretching is performed. Preferably, the sheet is stretched at a stretching ratio of 50% to 1,000% in the longitudinal direction and at a stretching ratio of 50% to 2,500% in the lateral direction. In particular, by setting the stretching ratio in the lateral direction to be in the range described above, mechanical strength in the circumferential direction can be improved when the sheet is wound around the tube, and durability against surface cleaning with gas bubbles can be improved.

Furthermore, in the case where the filtration layer is formed by winding a sheet around the tube constituting the support layer, fine irregularities may be provided on the outer peripheral surface of the tube. By providing irregularities on the outer peripheral surface of the tube, misalignment with the sheet can be prevented, and adhesion between the tube and the sheet is improved, thus preventing the filtration layer from being peeled off from the support layer by cleaning with gas bubbles. The number of turns of the sheet can be adjusted depending on the thickness of the sheet, and may be set to one or more. Furthermore, a plurality of sheets may be wound around the tube. The method of winding the sheet around the tube is not particularly limited, and the sheet may be wound in the circumferential direction of the tube, or may be spirally wound.

The size (difference in height) of the fine irregularities is preferably 20 to 200 μm. The fine irregularities are preferably formed over the entire outer peripheral surface of the tube, but may be formed partially or discontinuously. As the method of forming the fine irregularities on the outer peripheral surface of the tube, for example, surface treatment by flames, laser irradiation, plasma irradiation, or dispersion coating of a fluororesin or the like may be used. Surface treatment by flames, in which irregularities can be easily formed without affecting tube properties, is preferable.

Furthermore, a method may be used in which an unsintered tube and an unsintered sheet are used, and after winding the sheet around the tube, sintering is performed, thereby enhancing adhesion therebetween.

The average thickness of the filtration layer is preferably 5 to 100 μm. By setting the average thickness of the filtration layer to be in the range described above, it is possible to impart high filtration performance to the hollow-fiber membranes 15 easily and reliably.

The lower limit of the average outside diameter of the hollow-fiber membranes 15 is preferably 2 mm, and more preferably 2.1 mm. The upper limit of the average outside diameter of the hollow-fiber membranes 15 is preferably 6 mm, and more preferably 4 mm. When the average outside diameter of the hollow-fiber membranes 15 is less than the lower limit, there is a concern that the mechanical strength of the hollow-fiber membranes 15 may become insufficient.

On the other hand, when the average outside diameter of the hollow-fiber membranes 15 is more than the upper limit, the ratio of the surface area to the cross-sectional area of the hollow-fiber membranes 15 is decreased, and there is a concern that filtration efficiency may become insufficient and the surface area scrubbed with one gas bubble may be decreased.

The lower limit of the average inside diameter of the hollow-fiber membranes 15 is preferably 0.5 mm, and more preferably 0.9 mm. The upper limit of the average inside diameter of the hollow-fiber membranes 15 is preferably 4 mm, and more preferably 3 mm. When the average inside diameter of the hollow-fiber membranes 15 is less than the lower limit, there is a concern that pressure loss may increase at the time of discharging of the filtrate inside the hollow-fiber membranes 15. On the other hand, when the average inside diameter of the hollow-fiber membranes 15 is more than the upper limit, the thickness of the hollow-fiber membranes 15 is decreased, and there is a concern that mechanical strength and the effect of preventing permeation of impurities may become insufficient.

The lower limit of the ratio of the average inside diameter to the average outside diameter of the hollow-fiber membranes 15 is preferably 0.3, and more preferably 0.4. The upper limit of the ratio of the average inside diameter to the average outside diameter of the hollow-fiber membranes 15 is preferably 0.8, and more preferably 0.6. When the ratio of the average inside diameter to the average outside diameter of the hollow-fiber membranes 15 is less than the lower limit, the thickness of the hollow-fiber membranes 15 increases more than necessary, and there is a concern that water permeability of the hollow-fiber membranes 15 may become insufficient. On the other hand, when the ratio of the average inside diameter to the average outside diameter of the hollow-fiber membranes 15 is more than the upper limit, the thickness of the hollow-fiber membranes 15 decreases, and there is a concern that mechanical strength and the effect of preventing permeation of impurities may become insufficient.

The lower limit of the average length of the hollow-fiber membranes 15 is preferably 1 m, and more preferably 1.5 m. The upper limit of the average length of the hollow-fiber membranes 15 is preferably 5 m, and more preferably 4 m. When the average length of the hollow-fiber membranes 15 is less than the lower limit, the surface area of the hollow-fiber membranes 15 scrubbed with one gas bubble supplied from below the filtration membrane module 2 during the period in which the gas bubble rises to the water surface decreases, and there is a concern that efficiency of cleaning of the hollow-fiber membranes 15 may become insufficient. On the other hand, when the average length of the hollow-fiber membranes 15 is more than the upper limit, there is a concern that deflection of the hollow-fiber membranes 15 may be increased excessively by their own weight, and there is a concern that handleability may become insufficient during installation of the filtration membrane module 2 or the like. Note that the average length of the hollow-fiber membranes 15 refers to the average length of an exposed region of the hollow-fiber membranes 15 between the upper holding member 16 and the lower holding member 17, i.e., the average distance from the lower surface of the upper holding member 16 to the upper surface of the lower holding member 17.

The lower limit of the ratio of the average length to the average outside diameter (aspect ratio) of the hollow-fiber membranes 15 is preferably 200, and more preferably 400. The upper limit of the aspect ratio of the hollow-fiber membranes 15 is preferably 3,000, and more preferably 2,500. When the aspect ratio of the hollow-fiber membranes 15 is less than the lower limit, the surface area of the hollow-fiber membranes 15 that can be scrubbed with one gas bubble decreases, and therefore there is a concern that efficiency of cleaning the hollow-fiber membranes 15 may become insufficient. On the other hand, when the aspect ratio of the hollow-fiber membranes 15 is more than the upper limit, the hollow-fiber membranes 15 are excessively elongated, and therefore there is a concern that mechanical strength may become insufficient when the hollow-fiber membranes 15 are arranged in parallel in the upward-downward direction.

The lower limit of the porosity of the hollow-fiber membrane 15 is preferably 75%, and more preferably 78%. The upper limit of the porosity of the hollow-fiber membrane 15 is preferably 90%, and more preferably 85%. When the porosity of the hollow-fiber membrane 15 is less than the lower limit, water permeability decreases, and there is a concern that the filtration capability of the filtration membrane module 2 may become insufficient. On the other hand, when the porosity of the hollow-fiber membrane 15 is more than the upper limit, there is a concern that mechanical strength and resistance to scrubbing of the hollow-fiber membrane 15 may become insufficient. Note that the porosity refers to the ratio of the total volume of pores to the volume of the hollow-fiber membrane 15 and can be obtained by measuring the density of the hollow-fiber membrane 15 in accordance with ASTM-D-792.

The lower limit of the percentage of area occupied by pores in the hollow-fiber membrane 15 is preferably 40%. The upper limit of the percentage of area occupied by pores in the hollow-fiber membrane 15 is preferably 60%. When the percentage of area occupied by pores is less than the lower limit, water permeability decreases, and there is a concern that the filtration capability of the filtration membrane module 2 may become insufficient. On the other hand, when the percentage of area occupied by pores is more than the upper limit, the surface strength of the hollow-fiber membrane 15 becomes insufficient, and there is a concern that the hollow-fiber membrane 15 may be damaged by scrubbing with gas bubbles. Note that the percentage of area occupied by pores refers to the ratio of the total area of pores in the outer peripheral surface (surface of the filtration layer) of the hollow-fiber membrane 15 to the surface area of the hollow-fiber membrane 15 and can be determined by analyzing an electron micrograph of the outer peripheral surface of the hollow-fiber membrane 15.

The lower limit of the mean pore diameter of the hollow-fiber membrane 15 is preferably 0.01 µm. The upper limit of the mean pore diameter of the hollow-fiber membrane 15 is preferably 0.45 µm, and more preferably 0.1 µm. When the mean pore diameter of the hollow-fiber membrane 15 is less than the lower limit, there is a concern that water permeability may become insufficient. On the other hand, when the mean pore diameter of the hollow-fiber membrane 15 is more than the upper limit, there is a concern that it may not be possible to prevent impurities contained in water to be treated from permeating into the hollow-fiber membrane 15. Note that the mean pore diameter refers to the mean pore diameter on the outer peripheral surface (surface of the filtration layer) of the hollow-fiber membrane 15 and can be measured by a pore diameter distribution measuring apparatus (e.g., "automated pore diameter distribution measuring system for porous materials", manufactured by Porus Materials, Inc).

The lower limit of the tensile strength of the hollow-fiber membrane 15 is preferably 50 N, and more preferably 60 N. When the tensile strength of the hollow-fiber membrane 15 is less than the lower limit, there is a concern that durability against surface cleaning with gas bubbles may become insufficient. Although the upper limit of the tensile strength of the hollow-fiber membrane 15 is not particularly limited, the maximum value of the tensile strength of a hollow-fiber membrane that can be produced with the current technology is about 150 N. Note that the "tensile strength" means the maximum tensile stress obtained when a tensile test is performed, in accordance with JIS-K7161: 1994, at a gauge length of 100 mm and a testing speed of 100 mm/min.

The lower limit of the density (N/A) of the hollow-fiber membranes 15, which is obtained by dividing the number N of hollow-fiber membranes 15 held by the lower holding member 17 by the area A of the region in which the hollow-fiber membranes 15 are arranged, is preferably 4 membranes/cm$^2$, and more preferably 6 membranes/cm$^2$. The upper limit of the density of the hollow-fiber membranes 15 is preferably 15 membranes/cm$^2$, and more preferably 12 membranes/cm$^2$. When the density of the hollow-fiber membranes 15 is less than the lower limit, there is a concern that the filtration efficiency per unit volume of the filtration membrane module 2 may become insufficient. On the other hand, when the density of the hollow-fiber membranes 15 is more than the upper limit, the distance between the hollow-fiber membranes 15 is decreased, and there is a concern that it may not be possible to clean the surfaces satisfactorily. The term "region in which the hollow-fiber membranes are arranged" refers to an imaginary polygon having the smallest area among the imaginary polygons that include all the hollow-fiber membranes 15 in the filtration membrane module 2 when viewed in the axial direction of the hollow-fiber membranes.

Furthermore, assuming that the hollow-fiber membranes 15 are solid, the lower limit of the area fraction (S/A) of the hollow-fiber membranes 15 obtained by dividing the sum S of cross-sectional areas of the hollow-fiber membranes 15 held by the lower holding member 17 by the area A of the region in which the hollow-fiber membranes 15 are arranged is preferably 20%, and more preferably 25%. Furthermore, the upper limit of the area fraction of the hollow-fiber membranes 15 is preferably 60%, and more preferably 55%. When the area fraction of the hollow-fiber membranes 15 is less than the lower limit, there is a concern that the filtration efficiency per unit volume of the filtration membrane module 2 may become insufficient. On the other hand, when the area fraction of the hollow-fiber membranes 15 is more than the upper limit, the distance between the hollow-fiber membranes 15 is decreased, and there is a concern that it may not be possible to clean the surfaces satisfactorily.

(Upper Holding Member)

The upper holding member 16 is a member that holds the upper ends of a plurality of hollow-fiber membranes 15, communicates with pores of the hollow-fiber membranes 15, and constitutes a water-collecting header connected to the treated water passage 8. The water-collecting header may be provided inside the upper holding member 16, or an upper end portion of the filtration tank 14 may be used as the water-collecting header by dividing the filtration tank 14 with the upper holding member 16. The shape of the upper holding member 16 is not particularly limited, and the cross-sectional shape thereof may be polygonal, circular, or the like.

(Lower Holding Member)

The lower holding member 17 is a member that holds the lower ends of a plurality of hollow-fiber membranes 15. The lower holding member 17 includes an outer frame 17a and a plurality of fixing portions 17b which fix the lower ends of the hollow-fiber membranes 15 and also seals the lower ends of the hollow-fiber membranes 15. The fixing portions 17b are, for example, bar-shaped and are arranged substantially in parallel at certain intervals so that water to be treated and gas bubbles of inert gas can pass therebetween. A plurality of hollow-fiber membranes 15 are disposed on the upper side of each fixing portion 17b.

Both ends of one hollow-fiber membrane 15 may be fixed with the upper holding member 16 and the lower holding member 17. Alternatively, one hollow-fiber membrane 15 may be bent in a U-shape, two openings may be fixed with the upper holding member 16, and a folded (curved) portion at the lower end may be fixed with the lower holding member 17.

The outer frame 17a is a member that supports the fixing portions 17b. The length of one side of the outer frame 17a can be set, for example, to be 50 to 200 mm. Furthermore, the cross-sectional shape of the outer frame 17a is not particularly limited, and may be polygonal such as rectangular, or circular.

The width (length in the lateral direction) of the fixing portions 17b and the spaces therebetween are not particularly limited as long as a sufficient number of hollow-fiber membranes 15 can be fixed, and gas bubbles of inert gas supplied from the supply passage 4 can pass therethrough. The average width of the fixing portions 17b can be set, for example, to be 3 to 10 mm. The average space between the fixing portions 17b can be set, for example, to be 1 to 10 mm.

The material for each of the upper holding member 16 and the lower holding member 17 is not particularly limited, and for example, an epoxy resin, an ABS resin, a silicone resin, or the like can be used.

The method for fixing the hollow-fiber membranes 15 to each of the upper holding member 16 and the lower holding member 17 is not particularly limited, and for example, a method in which fixing is performed using an adhesive may be employed.

Furthermore, in order to facilitate handling (transport, installation, replacement, etc.) of the filtration membrane module 2, preferably, the upper holding member 16 and the lower holding member 17 are joined with each other by a joining member. As the joining member, for example, a supporting bar made of a metal, a casing (external cylinder) made of a resin, or the like can be used.

<Treated Water Tank>

The treated water tank 3 is a container that stores treated water filtered by the filtration membrane module 2. The treated water tank 3 may be a container open to the atmosphere. The treated water tank 3 is arranged in order to secure treated water that is used as backwash water, which will be described later, and to temporarily store treated water so that the treated water quality can be checked.

The treated water tank 3 is made of a metal or resin. In particular, from the viewpoint of strength, heat resistance, chemical resistance, and the like, the material for the treated water tank 3 is preferably stainless steel, polypropylene, or an acrylonitrile-butadiene-styrene copolymer (ABS resin). Furthermore, the treated water tank 3 may be provided, on the outer side thereof, with a reinforcing member, a leg member for self-support, and the like.

The treated water tank 3 has a capacity sufficient to secure treated water to be used as backwash water. For example, the backwash flow rate is 2 to 10 times the filtration flow rate.

<Supply Passage>

The supply passage 4 is formed mainly of a pipe and connects the water-to-be-treated tank 1 to the filtration membrane module 2. The supply passage 4 is provided with a supply pump 18 which pumps out water to be treated, and an aspirator 19 which produces a negative pressure by means of the Venturi effect due to constriction of a passage of water to be treated, aspirates a gas through the gas transport passage 7, and introduces the gas into water to be treated.

(Supply Pump)

The supply pump 18 can be any pump capable of pumping out water to be treated. The discharge pressure of the supply pump 18 is, for example, 10 to 1,000 kPa.

The discharge rate of the supply pump 18, i.e., the feed rate of water to be treated to the filtration membrane module 2, is set, for example, at 20 to 1,000 $L/m^2 \cdot hr$ on the basis of unit area of hollow-fiber membrane 15.

(Aspirator)

The aspirator 19 produces a negative pressure by means of the Venturi effect due to constriction of the cross-sectional area of a passage of water to be treated, aspirates an inert gas through the gas transport passage 7, which is connected to a gas aspiration port and will be described later, and mixes the inert gas into water to be treated.

The aspirator 19 is preferably configured to shear the aspirated inert gas into very small gas bubbles. As an aspirator that generates very small gas bubbles, for example, a commercially available microbubble generator may be used.

The amount (volume at atmospheric pressure at 20° C.) of inert gas to be mixed with water to be treated per unit volume by the aspirator 19 is, for example, 0.5 to 5 NL/L.

<Recirculation Passage>

The recirculation passage 5 is formed mainly of a pipe, and the inert gas supply unit 11 is connected to the middle thereof. During steady operation, basically all of the inert gas supplied, together with water to be treated, from the supply passage 4 to the filtration membrane module 2 is returned, together with water to be treated, through the recirculation passage 5 to the water-to-be-treated tank 1.

<Raw Water Passage>

The raw water passage 6 is formed mainly of a pipe. A ball tap 20 is arranged in the raw water passage 6. The ball tap 20 adjusts the flow rate of water to be treated in the raw water passage 6 so as to maintain the height of the liquid level of the water to be treated stored in the water-to-be-treated tank 1 and functions as a liquid level-adjusting mechanism of the water treatment system.

<Gas Transport Passage>

The gas transport passage 7 is formed mainly of a pipe, one end thereof being open to the upper space in the water-to-be-treated tank 1, the other end thereof being connected to the gas aspiration port of the aspirator 19. Preferably, the gas transport passage 7 is arranged so as to be open at a position distant from the liquid surface of the water-to-be-treated tank 1 so as not to be splashed with the water to be treated recirculated through the recirculation passage 5.

<Treated Water Passage>

The treated water passage 8 is formed mainly of a pipe and has an on-off valve 21 disposed on the downstream side of the position to which the backwash water passage 9 is connected. One end of the treated water passage 8 is hermetically connected to the filtration membrane module 2, and the other end may be open to the atmosphere inside the treated water tank 3.

(On-Off Valve)

The on-off valve 21 of the treated water passage 8 is always left open during steady operation. However, the on-off valve 21 is closed when the filtration membrane module 2 is backwashed using the backwash water passage 9, which will be described later, so that the treated water used as backwash water can be prevented from flowing back into the treated water tank 3.

<Backwash Water Passage>

The backwash water passage 9 is formed mainly of a pipe and is provided with a backwash pump 22 for pressure-feeding the treated water stored in the treated water tank 3 and an on-off valve 23 disposed on the downstream side (on the treated water passage 8 side) of the backwash pump 22.

(Backwash Pump)

The backwash pump 22 can be any pump capable of pressure-feeding treated water. The discharge pressure of the backwash pump 22 is, for example, 20 to 300 kPa.

(On-Off Valve)

The on-off valve 23 of the backwash water passage 9 is always closed during steady operation to cut off the passage so as to prevent flowing of treated water from the treated water passage 8 into the backwash water passage 9. Furthermore, the on-off valve 23 of the backwash water passage 9 is left open during backwashing so as to enable supply of backwash water to the filtration membrane module 2.

<Discharge Channel>

The discharge channel 10 is formed mainly of a pipe. By allowing the treated water stored in the treated water tank 3 to overflow, the amount of treated water stored in the treated water tank 3 is maintained constant.

<Inert Gas Supply Unit>

The inert gas supply unit 11 includes a gas cylinder 24 which stores a high-pressure inert gas, a supply valve 25, and a gas supply passage 26 which connects between the gas cylinder 24 and the recirculation passage 5.

(Inert Gas)

A gas that has an oxygen volume content of 10% or less, preferably 1% or less, and therefore does not allow flammable materials to burn is used as the inert gas supplied by the inert gas supply unit 11. Furthermore, in the inert gas, in order to prevent production of oxygen by microorganisms and the like, the volume content of carbon dioxide having biological activity is preferably 1% or less. The main component of such an inert gas may be, for example, nitrogen, argon, or the like, and in particular, nitrogen, which is inexpensive, is preferable.

In the inert gas supply unit 11, before the start of operation of the water treatment system, the supply valve 25 is opened to fill the water-to-be-treated tank 1 with an inert gas. During steady operation, the supply valve 25 is usually closed. Furthermore, in the water treatment system, in the case where the amount of inert gas that fills the system is decreased because of leakage of the inert gas to the outside or slow dissolution of the inert gas into water to be treated, the inert gas may be replenished from the inert gas supply unit 11. The decrease in the inert gas in the system can be determined, for example, by detecting the pressure inside the water-to-be-treated tank 1.

Furthermore, the water treatment system may be provided with an exhaust passage through which air existing inside the water-to-be-treated tank 1, the filtration membrane module 2, the recirculation passage 5, or the like is discharged when filled with the inert gas by the inert gas supply unit 11.

By providing the exhaust passage, air inside the system can be discharged and replaced with the inert gas, and the oxygen concentration can be more reliably decreased to prevent explosions.

<Suspended Matter Discharge Passage>

The suspended matter discharge passage 12 is formed mainly of a pipe and has an on-off valve 27 disposed therein. The suspended matter discharge passage 12 is used for discharging suspended matter (e.g., a layer of separated oil) in the vicinity of the liquid surface of water to be treated inside the water-to-be-treated tank 1 by opening the on-off valve 27.

<Sediment Discharge Passage>

The sediment discharge passage 13 is formed mainly of a pipe and has an on-off valve 28 disposed therein. The sediment discharge passage 13 is used for discharging sediments (slurry) in water to be treated inside the water-to-be-treated tank 1 by opening the on-off valve 28.

<Advantages>

Since the water treatment system is provided with the gas transport passage 7 through which the inert gas is supplied from the upper space of the water-to-be-treated tank 1 to the aspirator 19, it is possible to supply water to be treated containing gas bubbles of the inert gas to the filtration membrane module 2, and clogging of the hollow-fiber membranes 15 can be suppressed by the scrubbing effect of gas bubbles.

Furthermore, in the water treatment system, since the inert gas is allowed to hermetically fill the space above the liquid surface of the water to be treated that is stored in the water-to-be-treated tank 1, it is possible to eliminate gaseous oxygen from a closed system for circulating water to be treated between the water-to-be-treated tank 1 and the filtration membrane module 2. Therefore, even when flammable gas is generated from water to be treated because of decomposition of organic substances contained in the water to be treated, since the oxygen concentration in the system in which the water to be treated is circulated is low, explosions or combustion of the generated flammable gas can be prevented.

Furthermore, in the water treatment system, by using the filtration membrane module 2 including the airtight filtration tank 14 and a plurality of hollow-fiber membranes 15 disposed inside the filtration tank 14 and held in a state of being arranged in parallel in one direction, and by performing external-pressure crossflow-type filtration, in which while maintaining the internal pressure of the filtration tank 14 higher than the atmospheric pressure, water to be treated is passed from one end side, in the direction in which the hollow-fiber membranes 15 are arranged in parallel, to the other end side, water to be treated can be filtered efficiently, and it is possible to reduce the risk of taking in the outside air since the inside pressure of the water treatment system is maintained equal to or higher than the atmospheric pressure.

Furthermore, in the water treatment system, by maintaining the height of the liquid level of the water to be treated in the water-to-be-treated tank 1 by means of the ball tap 20, the pressure of the inert gas inside the water-to-be-treated tank 1 can be maintained. Accordingly, the amount of inert gas aspirated by the aspirator 19 can be kept constant without newly adding inert gas, and therefore, it is possible to suppress consumption of the inert gas.

Furthermore, since the water treatment system is provided with the treated water tank 3, the treated water passage 8, and the backwash water passage 9, the filtration membrane module 2 can be backwashed by using the treated water stored in the treated water tank 3 as backwash water. Oil and suspended solids adhering to the hollow-fiber membranes 15 are removed and returned through the recirculation passage 5 to the water-to-be-treated tank 1 by the backwashing, and thereby, the filtration capability of the hollow-fiber membranes 15 can be recovered.

Furthermore, since the water treatment system is provided with the inert gas supply unit 11, the inert gas can be easily replenished into the system at the time of dissolution of the inert gas into water to be treated or leakage of the inert gas out of the system.

Furthermore, since the water treatment system is provided with the suspended matter discharge passage 12 and the sediment discharge passage 13, suspended matter and sediments separated from the water to be treated inside the water-to-be-treated tank 1 can be appropriately discharged, and it is possible to prevent suspended matter and sediments from being supplied to the filtration membrane module 2.

Other Embodiments

It should be considered that the embodiment disclosed this time is illustrative and non-restrictive in all aspects. The scope of the present invention is not limited to the embodiment described above but is defined the appended claims, and is intended to include all modifications within the meaning and scope equivalent to those of the claims.

In the water treatment system, basically, since the amount of inert gas introduced into the system is not decreased, it is not necessary to supply the inert gas frequently, and the inert gas supply unit may be omitted.

Furthermore, the gas supply passage of the inert gas supply unit may be connected to the water-to-be-treated tank.

The water treatment system may omit the treated water tank and may be configured such that treated water flowing out of the filtration membrane module is directly discharged into a river or the like. In this case, for example, city water or the like may be supplied as backwash water.

Furthermore, in the water treatment system, the liquid level-adjusting mechanism may be omitted. In this case, the amount of water to be treated stored in the water-to-be-treated tank decreases by the amount of treated water discharged from the filtration membrane module, and therefore, it may be possible to use batch processing in which the treatment is ended when the liquid level of the water-to-be-treated tank decreases to a certain height, and the concentrated water to be treated remaining in the water-to-be-treated tank is transferred to another treatment unit. For example, an evaporator for further concentrating the water to be treated and disposing of the concentrate as industrial waste may be considered as the other treatment unit.

Furthermore, in the water treatment system, as the liquid level-adjusting mechanism, a mechanism other than the ball tap, for example, a combination of a level sensor and a control valve may be used.

Furthermore, in the water treatment system, the suspended matter discharge passage and the sediment discharge passage of the water-to-be-treated tank may be omitted.

Furthermore, the filtration membrane module of the water treatment system may include filtration membranes other than the hollow-fiber membranes. Examples of the filtration membranes other than the hollow-fiber membranes include multi-layer flat membranes, pleated membranes, and spiral membranes.

Furthermore, in the filtration membrane module, the direction in which the hollow-fiber membranes are arranged in parallel, i.e., the water-passing direction of water to be treated, may be the lateral direction.

Furthermore, the water treatment system may be configured to perform filtration (immersion suction crossflow-type filtration in the case of hollow-fiber membranes) such that the internal pressure of the filtration tank is set at about the atmospheric pressure, a suction pump is arranged in the treated water passage to cause a difference in pressure between the water-to-be-treated side of the filtration membranes (the outer side in the case of hollow-fiber membranes) and the filtrate side (the inner side in the case of hollow-fiber membranes), and thus water in the water to be treated is passed through the filtration membranes.

Furthermore, the water treatment system may be configured to perform internal-pressure crossflow-type filtration in which water to be treated containing gas bubbles of an inert gas is passed in a pressurized state through the inner side of the hollow-fiber membranes, and treated water that has permeated the hollow-fiber membranes from the filtration layer located on the outer side of each hollow-fiber membrane is recovered.

INDUSTRIAL APPLICABILITY

The present invention can be suitably used for filtering water to be treated which contains suspended solids that are able to generate flammable gas when decomposed or in which flammable gas is dissolved in high concentrations, such as oilfield-produced water.

REFERENCE SIGNS LIST 1 water-to-be-treated tank
2 filtration membrane module
3 treated water tank
4 supply passage
5 recirculation passage
6 raw water passage
7 gas transport passage
8 treated water passage
9 backwash water passage
10 discharge channel
11 inert gas supply unit
12 suspended matter discharge passage
13 sediment discharge passage
14 filtration tank
15 hollow-fiber membrane
16 upper holding member
17 lower holding member
17a outer frame
17b fixing portion
18 supply pump
19 aspirator
20 ball tap (liquid level-adjusting mechanism)
21 on-off valve
22 backwash pump
23 on-off valve
24 gas cylinder
25 supply valve
26 gas supply passage
27 on-off valve
28 on-off valve

The invention claimed is:

1. A water treatment system comprising:
a water-to-be-treated tank which stores water to be treated;
a crossflow-type filtration membrane module which filters the water to be treated;
a supply passage through which the water to be treated is supplied to the filtration membrane module from the water-to-be-treated tank by using a supply pump; and
a recirculation passage through which the water to be treated is recirculated from the filtration membrane module to the water-to-be-treated tank,
wherein the supply passage is provided with an aspirator which mixes a gas with the supplied water to be treated, the gas being recirculated through the recirculation passage to the water-to-be-treated tank together with the water to be treated;
wherein the water-to-be-treated tank has an upper space provided above the liquid surface of the stored water to be treated, the upper space being hermetically filled with an inert gas; and
wherein the water-to-be-treated tank is further provided with a gas transport passage through which the inert gas is supplied from the upper space to the aspirator.

2. The water treatment system according to claim 1, wherein the filtration membrane module includes an airtight filtration tank, a plurality of hollow-fiber membranes disposed inside the filtration tank and held in a state of being arranged in parallel in one direction, and holding members configured to fix both ends of the hollow-fiber membranes;
wherein the supply passage is connected to one end side, in the direction in which the hollow-fiber membranes are arranged in parallel, of the filtration tank;
wherein the recirculation passage is connected to the other end side, in the direction in which the hollow-fiber membranes are arranged in parallel, of the filtration tank; and
wherein the internal pressure of the filtration tank is higher than the atmospheric pressure.

3. The water treatment system according to claim 2, wherein the ratio of the volume of the upper space to the total internal volume of the water-to-be-treated tank is ¼ to ⅔.

4. The water treatment system according to claim 2, further comprising a raw water passage through which water to be treated is newly supplied to the water-to-be-treated tank, and a liquid level-adjusting mechanism which adjusts the flow rate of water to be treated in the raw water passage so as to maintain the height of the liquid level in the water-to-be-treated tank.

5. The water treatment system according to claim 2, wherein the inert gas contains nitrogen as a main component.

6. The water treatment system according to claim 2, further comprising a treated water tank which stores treated water, a treated water passage through which treated water is fed from the filtration membrane module to the treated water tank, and a backwash water passage through which treated water is pressure-fed from the treated water tank to the filtration membrane module by using a backwash pump.

7. The water treatment system according to claim 2, further comprising an inert gas supply unit configured to introduce the inert gas into the water-to-be-treated tank or the recirculation passage.

8. The water treatment system according to claim 2, further comprising a suspended matter discharge passage through which suspended matter in the vicinity of the liquid surface of water to be treated is discharged from the water-to-be-treated tank.

9. The water treatment system according to claim 2, further comprising a sediment discharge passage for discharging sediments in water to be treated from the bottom of the water-to-be-treated tank.

10. The water treatment system according to claim 1, wherein the ratio of the volume of the upper space to the total internal volume of the water-to-be-treated tank is $1/4$ to $2/3$.

11. The water treatment system according to claim 1, further comprising a raw water passage through which water to be treated is newly supplied to the water-to-be-treated tank, and a liquid level-adjusting mechanism which adjusts the flow rate of water to be treated in the raw water passage so as to maintain the height of the liquid level in the water-to-be-treated tank.

12. The water treatment system according to claim 1, wherein the inert gas contains nitrogen as a main component.

13. The water treatment system according to claim 1, further comprising a treated water tank which stores treated water, a treated water passage through which treated water is fed from the filtration membrane module to the treated water tank, and a backwash water passage through which treated water is pressure-fed from the treated water tank to the filtration membrane module by using a backwash pump.

14. The water treatment system according to claim 1, further comprising an inert gas supply unit configured to introduce the inert gas into the water-to-be-treated tank or the recirculation passage.

15. The water treatment system according to claim 1, further comprising a suspended matter discharge passage through which suspended matter in the vicinity of the liquid surface of water to be treated is discharged from the water-to-be-treated tank.

16. The water treatment system according to claim 1, further comprising a sediment discharge passage for discharging sediments in water to be treated from the bottom of the water-to-be-treated tank.

* * * * *